Figure 5:
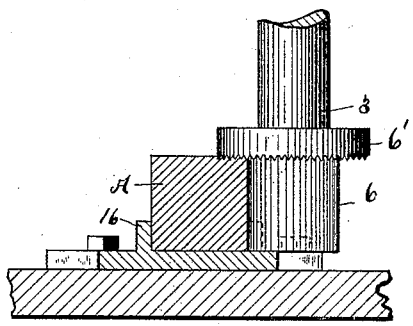

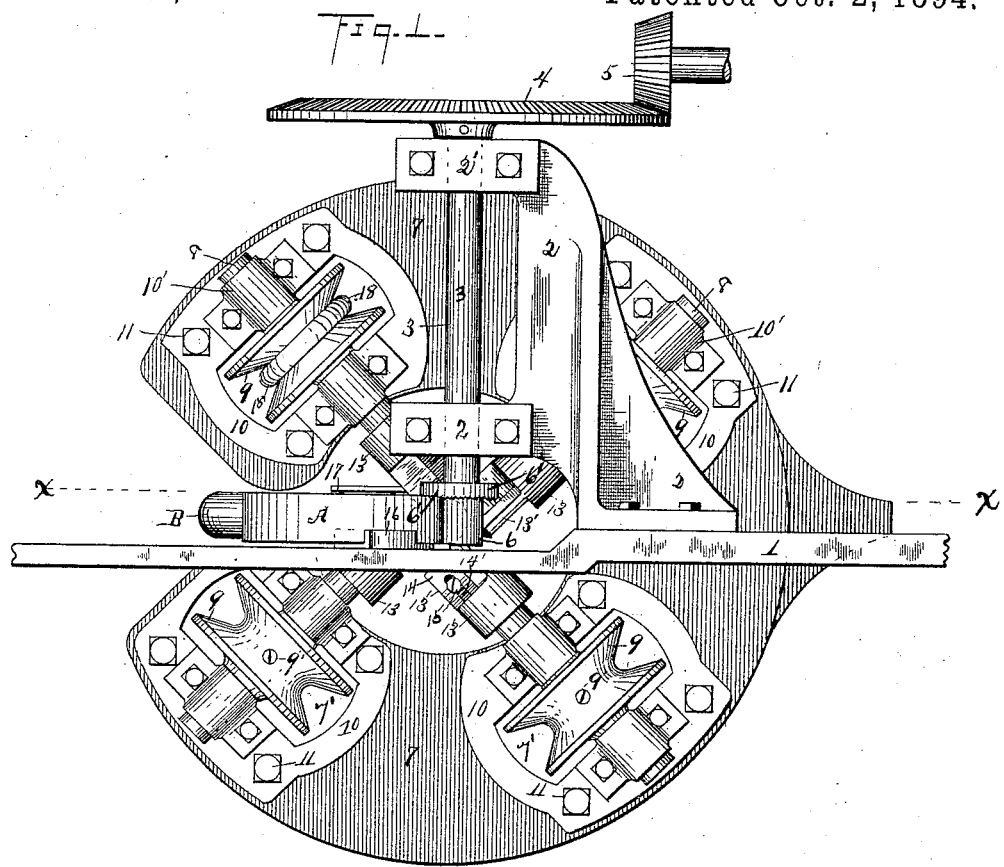

(No Model.) 3 Sheets—Sheet 3.

J. BANWELL.
MACHINE FOR MAKING HANDLES FOR SAD IRONS.

No. 526,672. Patented Oct. 2, 1894.

WITNESSES.
Belle S. Lowrie
R. L. Buchwalter

INVENTOR.
James Banwell
By Osborne & Sanders
ATTORNEYS.

(No Model.) 3 Sheets—Sheet 2.

J. BANWELL.
MACHINE FOR MAKING HANDLES FOR SAD IRONS.

No. 526,672. Patented Oct. 2, 1894.

WITNESSES.
Belle S. Lowrie
R. W. Buchwalter

INVENTOR.
James Banwell,
By Osborne & Sanders,
ATTORNEYS.

UNITED STATES PATENT OFFICE.

JAMES BANWELL, OF CLEVELAND, OHIO, ASSIGNOR TO THE CLEVELAND WOOD TURNING COMPANY AND J. ASHTON SAUNDERS, OF SAME PLACE.

MACHINE FOR MAKING HANDLES FOR SAD-IRONS.

SPECIFICATION forming part of Letters Patent No. 526,672, dated October 2, 1894.

Application filed January 15, 1892. Serial No. 418,335. (No model.)

*To all whom it may concern:*

Be it known that I, JAMES BANWELL, a citizen of the United States, residing at Cleveland, in the county of Cuyahoga and State of Ohio, have invented certain new and useful Improvements in Machines for Making Wooden Handles for Sad-Irons, of which the following, with the accompanying drawings, is a specification.

My invention relates to machines for making semi-circular wooden handles for sad-irons.

The object of my invention is a machine which is simple in construction and effective in operation to rapidly turn semi-circular wooden handles round in cross-section from previously prepared semi-circular pieces of wood that are rectangular in cross-section.

My invention consists in the construction and combination of parts shown in the drawings, described herein and defined in the claims.

Figure 6:
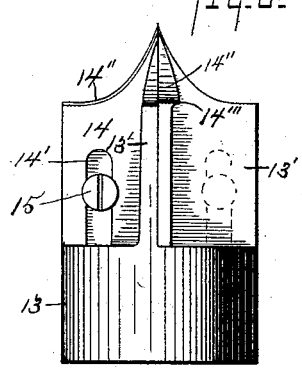
Figure 7:
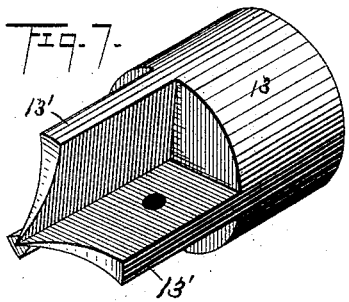
Figure 8:
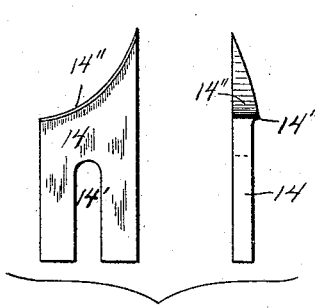
Figure 9:
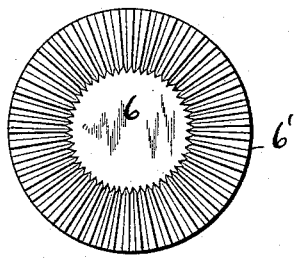
Figure 3:
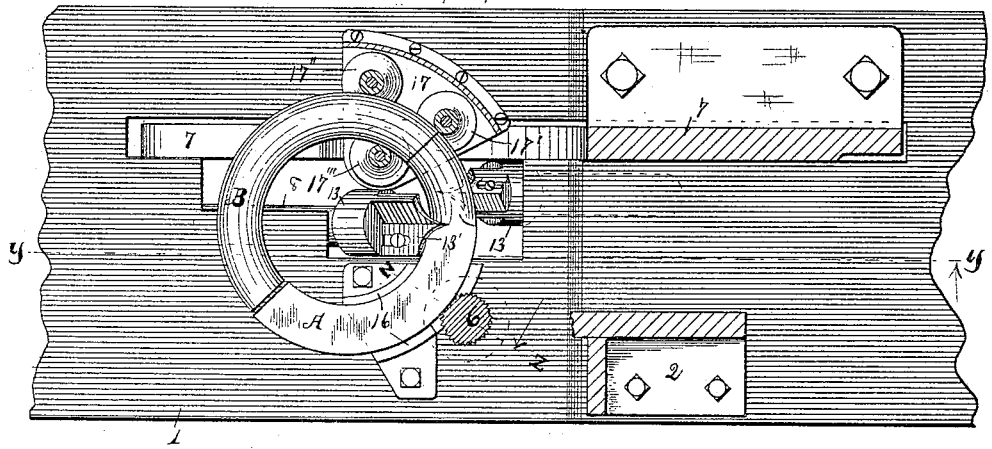
Figure 4:
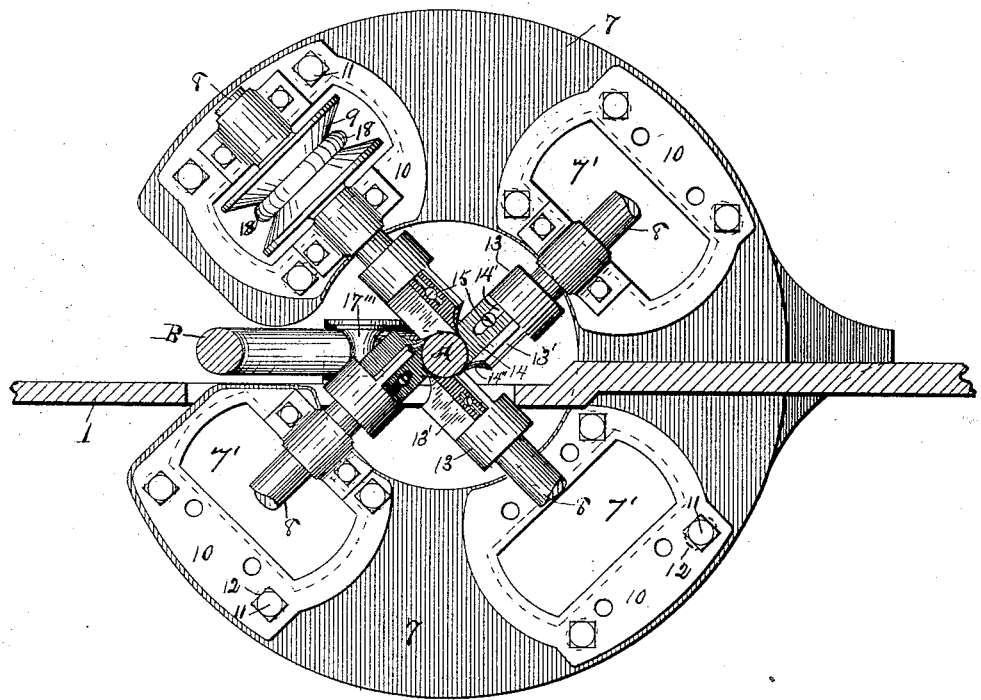

In the accompanying drawings, which form a part of my specification, Figure 1 is a front elevation of my machine. Fig. 2 is a plan of the same. Fig. 3 is a plan in section on the line $x\,x$ of Fig. 1. Fig. 4 is a vertical section on the line $y\,y$ of Fig. 3. Fig. 5 is a section on the line $z\,z$ of Fig. 3. Fig. 6 is an enlarged elevation of the cutter head with knives attached. Fig. 7 is an enlarged perspective of the cutter head with the knives removed. Fig. 8 illustrates a side elevation and an edge view of the knives, and Fig. 9 is an enlarged detail of the feed roller.

The machine operates to form a round handle out of a semi-circular piece of wood that is rectangular in cross-section. These pieces are sawed out by a suitable machine, and are then made round in cross-section by the present invention.

In the different figures of the drawings 1 is the bed-plate. 2 is a bracket secured to the bed-plate 1 to sustain the feed shaft 3. The feed shaft 3 is held by means of caps 2' and 2'', which are secured to the bracket 2 in the usual way, and form journals for said feed shaft. To the top of the feed shaft 3 is secured a crown gear 4 which is driven by a gear 5. To the bottom of the feed shaft is fixed a feed 6 which is round in cross-section, and has a shoulder 6', said feed 6 having vertical serrations on its circumference and the shoulder 6' having radial serrations on its under side.

A vertical frame or plate 7, which extends equally above and below the bed plate 1, supports the series of spindles 8. Said vertical plate 7 has openings 7' through it for the pulleys 9. To said plate 7 are secured open frames 10 to support the spindles 8. Said spindles are held in place to the open frames 10 by means of caps 10' in the usual way of holding turning spindles and shafts. Said open frames 10 are held to the vertical plate 7 by means of bolts 11 which pass through slots 12 in the vertical plate to allow of adjustment of said open frames. The slots are represented by dotted lines 12.

The pulleys 9 are mounted upon the spindles 8, within the open frames 10, and are held by a screw 9' to admit of adjustment of the spindles to and from the center of the machine.

To the inner ends of the series of spindles 8 are attached a corresponding series of cutter heads 13, such as are illustrated by Fig. 7. On the parts 13' are attached the knives or cutters 14. Said knives or cutters are attached by means of a screw 15 which passes through a slot 14' to admit of adjustment of the knives on the cutter head. Said knives 14 are curved on their outer ends 14'', and have the edge 14''' turned over and ground to a cutting edge. The cutting tool is shown with three cutting wings, but four or more may be employed. The cutters should terminate in a point at the center of the tool.

In front of the vertical plate 7 there is secured to the bed plate 1 a guide plate 16, which is adapted to receive the stock to be operated upon; and back of the vertical plate 7 is fixed a frame 17 holding three rollers, 17', 17'' and 17''', to guide and hold firmly one end of the stock being operated upon.

The guide plate 16, feed 6, and the rollers 17', 17'' and 17''' are so arranged as to form a curved way through the machine for the passage therethrough of the semi-circular piece of wood operated upon.

Two of the cutter heads, $f$ and $f'$, that set opposite each other, are placed in front of the other two marked b b'; and the points of all the cutters should pass the center of the stock operated upon.

The axes of the spindles 8 are parallel to lines tangential from the work in cross-section and approximate closely to said tangential lines. This construction carries points of the cutters a little beyond the center of the stock operated upon, as described in the preceding paragraph, and makes the cutters of each cutter-head overlap the work of the cutters of the adjacent cutter-head and leave the work smooth clear around the handle. For the sake of convenience, and for the want of a better descriptive term, this arrangement of the spindles 8 is described in the claims as "approximately tangential to a cross-section of the work."

A represents a semi-circular piece of wood sawed rectangular in cross-section, part of which has been turned; and B represents a semi-circular piece of wood that has been operated upon and made round in cross-section.

The stock A is fed into the machine through the plate 16. The feed roller 6 bears against the outer side of the stock A and the shoulder 6' bears down on top of the stock. The serrations in the feed bite into the wood to give it good hold, and forces the stock through between the cutter heads. As the stock is forced through between the cutter heads, the cutters revolve with the spindles 8 to which they are attached. Said spindles 8 and their attached cutters are driven with belts 18 which pass over the pulleys 9 and a pulley mounted upon a counter shaft. All the spindles are driven from the same counter-shaft.

The rollers 17', 17" and 17''' are grooved in their faces to fit the portion of the stock that has been operated upon by the cutters.

The cutters must be so made and placed that the space covered by each cutter will overlap the space covered by the adjacent cutters, and that each cutter will cut a segment of a circle from the rectangular piece of wood A.

The cutters rotate upon their own axis, and the stock passes between them as illustrated and described.

By changing the form of way or passage through which the stock passes and by changing the location of the feed, the machine will turn a rod of any curvature, and it may be adapted to turning straight work. By using one or more of the cutter-heads and turning the stock as it passes through the machine, spiral and other moldings may be cut by my machine.

What I claim as my invention, and desire to secure by Letters Patent, is—

1. The combination, in a machine for turning semi-circular handles, of a curved way through which a semi-circular handle may pass, a series of rotating spindles placed approximately tangential to a cross-section of the work, cutter-heads carried at the inner ends of said spindles, cutters attached to the cutter-heads, so that the end-faces of said cutters engage the work, and a feed, substantially as described.

2. The combination, in a machine for turning semi-circular handles, of a curved way through which a semi-circular handle may pass, a series of rotating spindles arranged approximately tangential to a cross-section of the work, the spindles being adjustable to and from the curved way, cutter-heads carried by the rotatable spindles, driving connection with the spindles, a feed and cutters, the end faces of which are adapted to engage the work, substantially as described.

3. The combination, in a machine for turning semi-circular handles, of a bed-plate, a vertical frame extending above and below the bed-plate, a curved-way through the vertical frame, a series of spindles arranged approximately tangential to a cross-section of the work, journals for the spindles, the journals being adjustable upon the vertical frame and the spindles being adjustable to and from the curved way, driving connection for the spindles, a feed, and cutters, the end faces of which are adapted to engage the work, substantially as described.

4. The combination, in a wood turning machine, of a bed-plate, a vertical frame extending above and below the bed-plate, a way through the vertical frame through which stock is adapted to pass, journals carried by the vertical frame, spindles carried in said journals and arranged approximately tangential to a cross-section of the work, cutter-heads upon the inner ends of said spindles, driving connection for the spindles, a feed, and cutters, the end faces of which are adapted to engage the work substantially as described.

5. The combination, in a wood turning machine, of a bed-plate, a vertical frame connected with the bed-plate, a way through the vertical frame through which stock is adapted to pass, journals adjustably fixed to the vertical frame, a spindle carried in said journals, the spindle being placed approximately tangential to a cross-section of the work, a cutter-head upon the inner end of the spindle, driving connection for the spindle, a feed, and cutters, the end faces of which are adapted to engage the work substantially as described.

In testimony whereof I affix my signature, in presence of two witnesses, this 28th day of December, 1891.

JAMES BANWELL.

Witnesses:
J. A. OSBORNE,
MARTIN W. SANDERS.